(12) United States Patent
Mireles et al.

(10) Patent No.: US 10,449,624 B2
(45) Date of Patent: Oct. 22, 2019

(54) METHOD OF FABRICATION FOR THE REPAIR AND AUGMENTATION OF PART FUNCTIONALITY OF METALLIC COMPONENTS

(71) Applicant: Board of Regents, The University of Texas System, Austin, TX (US)

(72) Inventors: Jorge Mireles, El Paso, TX (US);
Mohammad Hossain, Bangladesh (IN);
Ryan Wicker, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 320 days.

(21) Appl. No.: 15/282,048

(22) Filed: Sep. 30, 2016

(65) Prior Publication Data

US 2017/0095882 A1 Apr. 6, 2017

Related U.S. Application Data

(60) Provisional application No. 62/236,299, filed on Oct. 2, 2015.

(51) Int. Cl.
*B23K 15/00* (2006.01)
*B23K 26/342* (2014.01)
(Continued)

(52) U.S. Cl.
CPC ........ *B23K 15/0086* (2013.01); *B22F 3/1055* (2013.01); *B22F 7/062* (2013.01);
(Continued)

(58) Field of Classification Search
None
See application file for complete search history.

(56) References Cited

U.S. PATENT DOCUMENTS

| | | |
|---|---|---|
| 4,478,626 A | 10/1984 | Moritoki et al. |
| 5,147,086 A | 9/1992 | Fujikawa et al. |

(Continued)

FOREIGN PATENT DOCUMENTS

| | | |
|---|---|---|
| DE | 102010011059 A1 | 9/2011 |
| WO | 2014071968 A1 | 5/2014 |

OTHER PUBLICATIONS

Electron beam melting—Wikipedia, the free encyclopedia, printed Jul. 24, 2015, 4 pages.

*Primary Examiner* — Geoffrey S Evans
(74) *Attorney, Agent, or Firm* — Yee & Associates, P.C.

(57) ABSTRACT

Methods and systems for manufacturing a three-dimensional product. Fabrication of a three-dimensional part from a powder spread over a work table as a powder bed can be initiated. The fabrication process can be paused to cool down the work table to room temperature to obtain access to the three-dimensional part for post-processing operations such as, for example, embedding external artifacts. Fabrication can continue by preheating the powder rather than the work table until fabrication of the three-dimensional part is complete. A damaged part may be placed within the powder bed, wherein the fabrication process can be directly initiated to achieve part repair. Additionally, a material of the same part's composition can be used or a different material utilized to render the part better than new. Access to the three-dimensional part allows embedding of a foreign object in the three-dimensional part within the powder bed while the three-dimensional part remains non-finished.

17 Claims, 4 Drawing Sheets

(51) Int. Cl.
  *B33Y 10/00* (2015.01)
  *B33Y 30/00* (2015.01)
  *B33Y 50/02* (2015.01)
  *B22F 3/105* (2006.01)
  *B22F 7/06* (2006.01)
  *B22F 7/08* (2006.01)
  *B23P 6/00* (2006.01)

(52) U.S. Cl.
  CPC .............. *B22F 7/08* (2013.01); *B23K 26/342* (2015.10); *B23P 6/00* (2013.01); *B33Y 10/00* (2014.12); *B33Y 30/00* (2014.12); *B33Y 50/02* (2014.12); *B22F 2007/068* (2013.01); *B22F 2999/00* (2013.01); *Y02P 10/295* (2015.11)

(56) References Cited

U.S. PATENT DOCUMENTS

| | | | |
|---|---|---|---|
| 5,244,623 A | 9/1993 | King | |
| 5,387,380 A | 2/1995 | Cima et al. | |
| 5,427,735 A | 6/1995 | Ritter et al. | |
| 5,437,820 A | 8/1995 | Brotz | |
| 5,615,013 A * | 3/1997 | Rueb | G01B 11/00 356/394 |
| 7,537,722 B2 | 5/2009 | Andersson et al. | |
| 7,540,738 B2 | 6/2009 | Larsson et al. | |
| 7,815,826 B2 | 10/2010 | Serdy et al. | |
| 8,263,951 B2 | 9/2012 | Smiljanic | |
| 8,910,361 B2 | 12/2014 | Rickenbacher et al. | |
| 2007/0122562 A1* | 5/2007 | Adams | B22F 3/1055 427/532 |
| 2010/0043698 A1 | 2/2010 | Bolt | |
| 2010/0044547 A1* | 2/2010 | Higashi | B22F 3/003 249/79 |
| 2010/0193480 A1* | 8/2010 | Adams | B23K 9/04 219/121.15 |
| 2010/0305742 A1* | 12/2010 | Twelves, Jr. | B23P 21/004 700/112 |
| 2011/0282482 A1* | 11/2011 | Knighton | B33Y 30/00 700/111 |
| 2013/0055568 A1 | 3/2013 | Dusel et al. | |
| 2013/0228302 A1* | 9/2013 | Rickenbacher | C22C 19/056 164/492 |
| 2015/0024233 A1* | 1/2015 | Gunther | G05B 19/41875 428/601 |
| 2015/0054191 A1 | 2/2015 | Ljungblad | |
| 2015/0130118 A1* | 5/2015 | Cheng | B22F 3/1055 264/497 |
| 2016/0052057 A1* | 2/2016 | Xu | F01D 5/187 419/5 |
| 2016/0054115 A1* | 2/2016 | Snis | B23K 26/082 419/55 |
| 2016/0303806 A1* | 10/2016 | Mercelis | G03F 7/0037 |
| 2017/0274592 A1* | 9/2017 | Herzog | B33Y 10/00 |
| 2017/0286821 A1* | 10/2017 | Nardi | B33Y 80/00 |
| 2018/0043618 A1* | 2/2018 | Shemelya | B29C 70/82 |
| 2018/0079003 A1* | 3/2018 | Lin | B23K 15/0086 |

* cited by examiner

METHOD OF FABRICATION FOR THE REPAIR AND AUGMENTATION OF PART FUNCTIONALITY OF METALLIC COMPONENTS

CROSS-REFERENCE TO PROVISIONAL APPLICATION

This nonprovisional patent application claims the benefit under 35 U.S.C. § 119(e) to U.S. Provisional Patent Application Ser. No. 62/236,299 filed on Oct. 2, 2015, entitled "Method of Fabrication for the Repair and Augmentation of Part Functionality of Metallic Components," and which is hereby incorporated by reference in its entirety.

TECHNICAL FIELD

Embodiments are related to the manufacturing of three-dimensional products through successive fusion of selected parts on a work table in a layer-by-layer fashion. Embodiments further relate to techniques that fuse powder spread over a work piece, and/or a work piece with embedded artifacts, on a powder bed without the need of a work table. Embodiments also relate to EBM (Electronic Beam Melting) employed for AM (Additive Manufacturing).

BACKGROUND

Devices and systems have been implemented for manufacturing three-dimensional product by selectively fusing powder layers on a work table residing in a powder bed. For example, U.S. Pat. No. 7,537,722, which is incorporated herein by reference, discloses a device composed of a powder bed facilitating a work table, a powder dispenser along with a powder raking system to disperse a thin layer of powder on the work table, a vacuum pump to maintain vacuum that may avoid powder contamination, an energy beam created by a ray gun for directing power to the powder bed for powder fusion, elements to control the energy beam directed to the work table, and a controlling computer that stores the information of cross sections of a desired three-dimensional object.

The controlled energy beam selectively melts the thin layer of powder on top of the work table in accordance to the cross-section of a three-dimensional part. The raking system spreads a new layer of powder on top of the powder bed and fusion of the next layer of powder continues. A three-dimensional object is formed through successive fusion of cross-sectional area through selectively melting of powders on the powder bed in a layer-by-layer fashion. The consecutive process of melting and dispersing of powder on the work table continues until the three-dimensional part is finished.

It is important to control the energy beam directed to the work bench, while maintaining a proper powder distribution. The fusion of powder according to the three-dimensional object can lead to powder smoke, as a result of charging of powder that may repel each other, and floats from the powder bed. A preheating of the work table needs to be performed prior to spreading of the powder. The fusion of powder in room temperature on the work piece using the energy beam may lead to the smoking incident in the work bench. The smoking incident of the powder may cause failure of the fabrication process.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and system for manufacturing a three-dimensional part.

It is another aspect of the disclosed embodiments to provide for a method and system for fusing powder over a work piece, and/or a part with embedded artifacts, without prior heating of the work table.

The aforementioned aspects and other objectives and advantages can now be achieved as described herein. A method and system for manufacturing a three-dimensional product is disclosed. Fabrication of a three-dimensional part from powder spread over a work table as a powder bed can be initiated. The fabrication process can be paused to cool down the powder bed to room temperature to obtain access to the three-dimensional part. Fabrication can continue by preheating the powder rather than the work table until fabrication of the three-dimensional part is complete. Access to the three-dimensional work piece allows embedding of foreign objects such as, but not limited to, sensors and electronics into cavities that can be built into the work piece while the three-dimensional part is still non-finished.

The disclosed embodiments provide an approach of fusing powder spread over the work piece without prior heating of the work table. Embodiments can involve pausing the process at any point, cooling down the work piece to room temperature, and continuing fabrication by preheating the powder rather than the work table while avoiding process failure.

The use of different energy beam intensity starting from low intensity is applied on the powder bed to avoid smoking of the powder. The gradual increase of intensity of the energy beam helps the metal powder avoid powder repelling during the preheating process. Moreover, the preheating helps to minimize the thermal deviation in-between the build surface and the previously fabricated part on the work table. Finally, the preheating of powder may improve the bonding of the fabricated part by reducing any kind of residual stress. The disclosed embodiments can aid in fabrication of a three-dimensional part using multiple steps, which allows access to the part's structure prior to the final part at any desired location.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention, and together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the specification and claims, terms may have nuanced meanings suggested or implied in context beyond an explicitly stated meaning. Likewise, the phrase "in one embodiment" or "in an example embodiment" as used herein does not necessarily refer to the same embodiment and the phrase "in another embodiment" or "in another example embodiment" as used herein does not necessarily refer to a different embodiment. It is intended, for example, that claimed subject matter include combinations of example embodiments in whole or in part.

Figure 1:
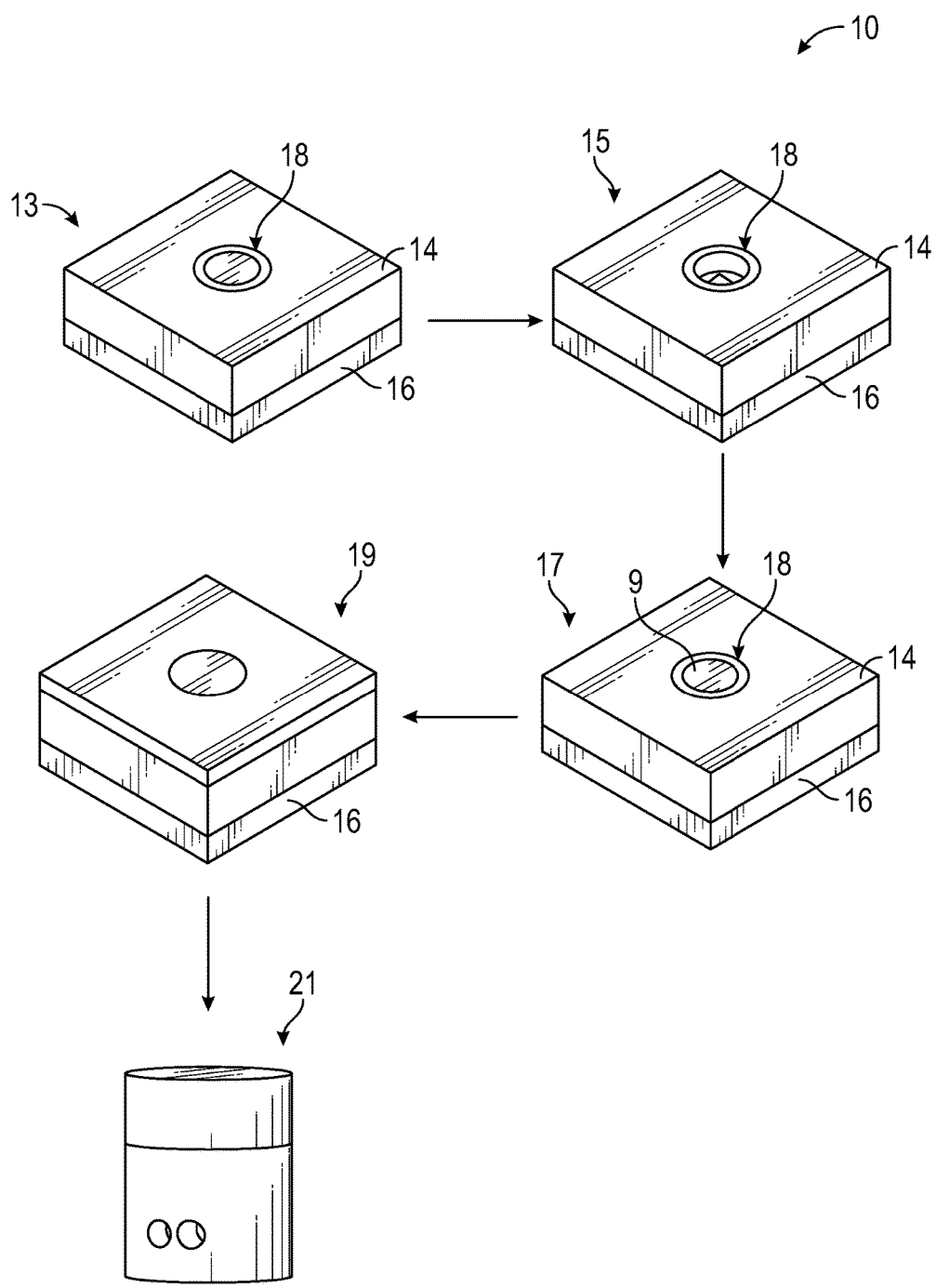
FIG. 1 illustrates a method to fuse powder spread over a work table without prior heating of the work table, in accordance with a preferred embodiment.

FIG. 1 illustrates a method 10 to fuse powder spread over a work piece on a powder bed 14 without prior heating of the work table 16, in accordance with a preferred embodiment. FIG. 1 depicts fabrication of a three-dimensional part with embedded entities. The method 10 depicted in FIG. 1 includes steps 13, 15, 17, 19, and 21. As shown at step 13, an operation can be implemented to fabricate a part up to a certain height on the work table 16 on which the three-dimensional product is to be built. A powder bed 14 is shown at step 13, for example, with respect to the work table 16. A powder dispenser can be arranged to lay down a thin layer of powder on the work table for the formation of the powder bed 16.

Note that in steps 13, 15, 17, 19, and 21 shown in FIG. 1, identical or similar parts or components are generally indicated by identical reference numerals. As shown next at step 15, an operation can be implemented to remove powder from a pre-designed cavity 18. Note that this cavity 18 is also shown in step 13, but is shown filled with powder. In step 15, the cavity is shown with the powder removed. Thereafter, as depicted at step 17, an operation can be implemented to embed foreign entities 9 in the cavity 18. The foreign entities 9 can create a planar surface with the powder bed 14. Next, as indicated at step 19, the fabrication process continues. Finally, as illustrated at step 21, the final part is shown with embedded objects.

The disclosed approach involves pausing the process at any point, cooling down the work table 16 to room temperature, and continuing fabrication by preheating the powder rather than the work table 16 while avoiding process failure.

In a preferred embodiment, EBM (Electron Beam Melting) may be employed for AM (Additive Manufacturing) involving, for example, metal parts. An EBM source may be utilized as energy beam source in the context of manufacturing the three-dimensional product. EBM is powder bed fusion technique, other examples of which are SLM (Selective Laser Melting) and SLS (Selective Laser Sintering). EBM is a preferred technique, but it can appreciated that SLM, SLS, or other techniques may also be employed, for example, in an alternative embodiment. A key difference between EBM, SLM, and SLS is that EBM uses an electron beam as its power source, as opposed to a laser. EBM technology manufactures parts by melting metal powder layer by layer with an electron beam in a high vacuum.

A key feature of the disclosed embodiments involves the use of different energy beam intensities, beginning from low intensity, which is applied on the powder bed 14 to avoid smoking of the powder. The gradual increase of intensity of the energy beam helps the metal powder avoid powder repelling during the preheating process. Moreover, the preheating helps to minimize the thermal deviation in-between the build surface and the previously fabricated part on the work table 16 that may prevent the work piece dislocation from the work table. Finally, the preheating of powder may improve the bonding of the fabricated part by reducing any kind of residual stress. Such an approach aids in the fabrication of a three-dimensional part using multiple steps, which gives access to the part's structure prior to the final part at any desired location.

A three-dimensional part can be fabricated through fusing the powder following the preheating of the work table 16 up to a certain height as shown at step 13. The part fabrication can then be stopped completely and cooled down to room temperature to have access to the part's structure. The access prior to finishing the end user part allows the embedding of a foreign object (e.g., sensor, metal parts, wire, etc.) in the non-finished fabricated part within the powder bed.

Then, the process is allowed to continue to complete the three-dimensional part. Since the part does not need to be removed from its original position, the process can be allowed to continue while avoiding registration of starting surface.

A controlling computer can record the last registration of the energy beam position, during the initial processing. In case the part is removed from the powder bed, a visual feedback, system can resolve the registration issue. The prior build position can be stored using the visual feedback method, and the following build position can be calculated using a reference of the previous processing step. Thus, part registration can be done based on the calculation of former work piece locations. That way, the present invention resolves the issue of centering of the energy beam that can lead to part's registration issues.

Figure 2:
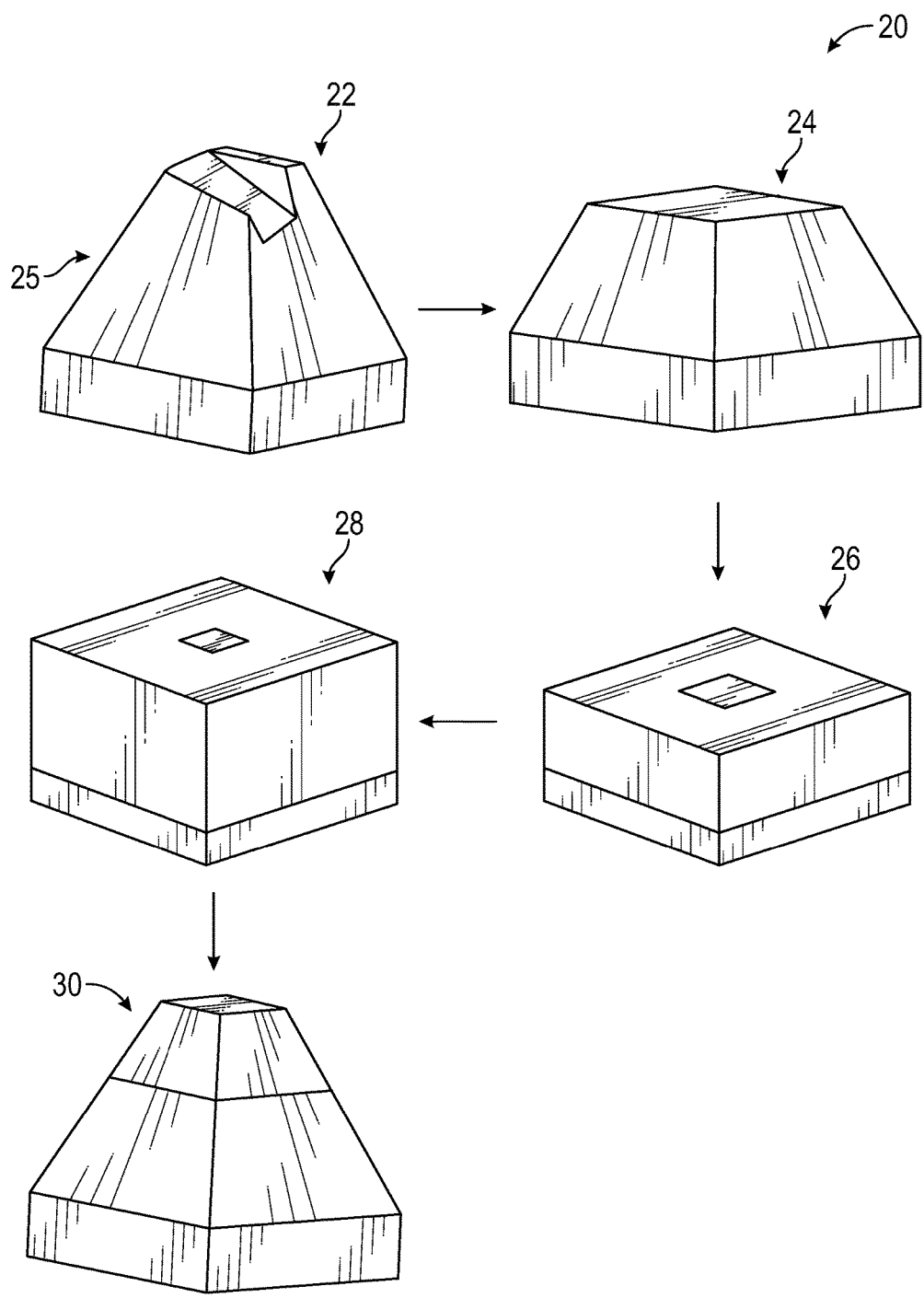
FIG. 2 illustrates a method of repairing a broken part, in accordance with an alternative embodiment.

FIG. 2 illustrates a method 20 of repairing a broken part, in accordance with an alternative embodiment. Method 20 shown in FIG. 2 includes steps 22, 24, 26, 28, and 30 in which the repair of a broken part can be completed using a similar process of preheating from a powder bed surface. An example of a broken part 25 is shown at step 22. The broken part 25 needs to be leveled horizontally using pre-processing procedures (e.g., CNC machining, polishing, etc.) as shown at step 24 to ensure a planar surface is achieved for powder spreading. The part can be placed within the powder in the powder bed as shown next at step 26. The low energy beam can heat up the powder within the powder bed, and therefore, the fabrication process continues as indicated at step 28. Thus, final part repair can be achieved to replicate the part in its original condition as depicted at step 30.

Figure 3:
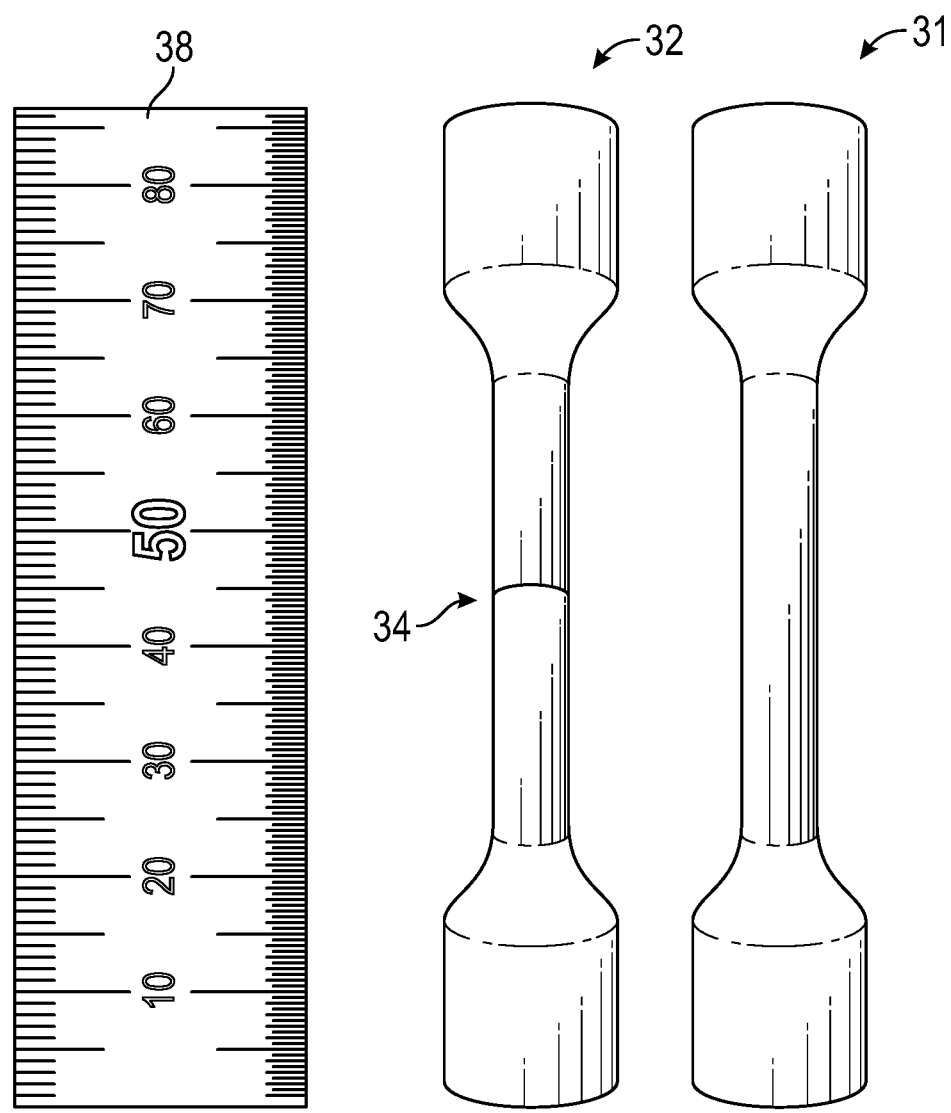
FIG. 3 illustrates examples of fabricated tensile test specimens using the paused build approach disclosed herein, in accordance with another embodiment.

FIG. 3 illustrates examples of fabricated tensile test specimens 31, 32 using the paused build approach disclosed herein, in accordance with an example embodiment. The interface bonding property 34 can be improved by additional melting sequence or increasing melting time. Moreover, a post processing (e.g., Hot Isostatic Pressing) can be useful in achieving further improvement. A portion of a ruler 38 is shown in FIG. 3 to provide context for measurements with respect to the test specimens 32.

Note that HIP (Hot Isostatic Pressing) is a manufacturing process that can be utilized to reduce the porosity of metals and increase the density of many ceramic materials. This improves the material's mechanical properties and workability. The HIP process subjects a component to both elevated temperature and isostatic gas pressure in a high pressure containment vessel. The pressurizing gas most widely used is argon. An inert gas can be utilized, so that the material does not chemically react. The chamber is heated, causing the pressure inside the vessel to increase. Many systems use associated gas pumping to achieve the necessary pressure level. Pressure can be applied to the material from all directions (hence the term "Isostatic").

Table 1 below illustrates sample data indicative of tensile strengths, achieved according to experimental implementations of the disclosed approach.

TABLE 1

Tensile test results

| | UTS (MPa) | Young's Modulus (GPa) | Elongation at Break (%) |
|---|---|---|---|
| Fabricated Tensile specimens_Machined | | | |
| Sample 1 | 681 | 47.59 | 1.5 |
| Sample 2 | 693 | 42.95 | 1.48 |
| Fabricated Tensile specimens_As Fabricated | | | |
| Sample 1 | 688 | 43.42 | 1.65 |
| Sample 2 | 681 | 44.05 | 1.88 |

The disclosed approach of having access to a non-finished part can revolutionize the three-dimensional part fabrication in the aspects of aerospace industries, automobile industries, and biomedical industries. Having access to a non-finished product allows the user a tremendous opportunity in fabricating next generation parts with embedded sensors for service monitoring. Such an embedding process can revolutionize the fabrication of three-dimensional parts, which can be ready to commercialize. The inclusive embedding of a sensor in the part's structure can give access to in situ monitoring in real time, and inhibiting the sensor from an outside environment condition. This allows the sensor life span to be increased and enable monitoring the internal part condition during operation. The repairing of end user parts can reduce the cost involved with the fabrication of a new part by saving material cost and fabrication time.

Some embodiments can implement an aspect of adding a material on top of the substrate. That is, such embodiments may be directed to creating multi-material structures with the same material composition as the substrate or a different composition with better properties as the substrate material is captured. Using a different material can render a damaged part "better than new" if the chosen material has better properties, or can be used to create functionally graded parts for nuclear applications where a single component can have better wear or corrosion resistance.

Figure 4:
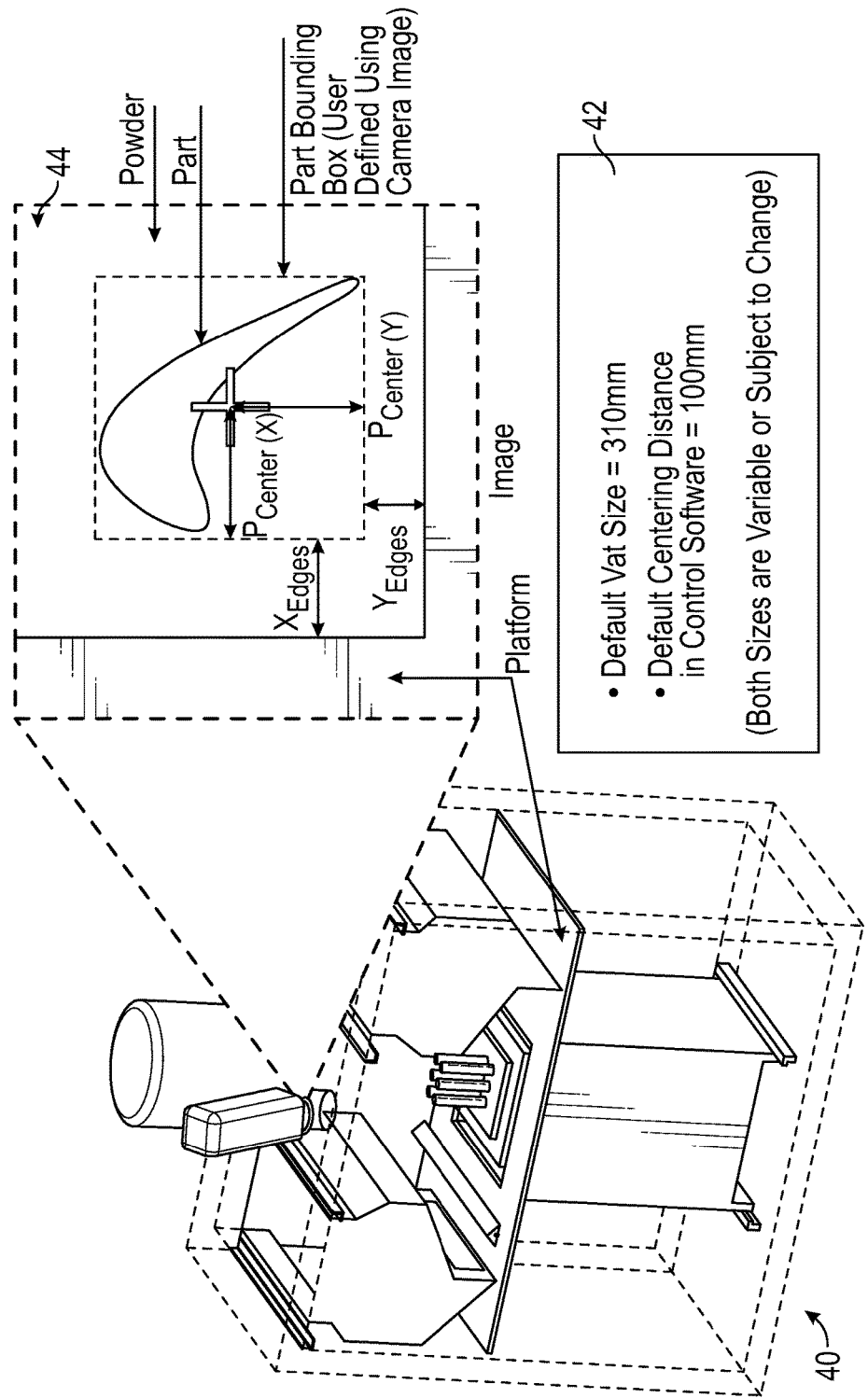
FIG. 4 illustrates a fabrication system and process thereof to demonstrate the concept of part registration, in accordance with another embodiment.

FIG. 4 illustrates a fabrication system 40 and a process thereof, in accordance with another embodiment. A general process or methodology associated with the system 40 shown in FIG. 4 can be implemented as discussed below. The graph 44 shown in FIG. 4 graphically demonstrates parameters associated with processing by system 40 including the power, the part, the part bounding box (user defined using a camera image), and so on. FIG. 4 and the discussion below are provided to demonstrate the concept of part registration. Note that as shown in the legend box 42 in FIG. 4 for the formulas shown below, it can be assumed that the default vat size=310 mm and the default centering distance in control software=100 mm (both sizes are variable or subject to change). It should be appreciated that these parameters are examples only and are not considered limiting features of the disclosed embodiments. Other sizes and can be utilized in the context of other embodiments.

Parameters Defined by Camera for X-Direction (Assuming Camera Captures Bottom Left Area of Vat):

$$X_\Delta = X_{Edges} + P_{Center(x)}$$

where:

$X_{Edges}$=Distance between edge of vat in camera image and edge of part detected in image in X $P_{Center(x)}$=Center distance of part detected in camera image in X Center in EBM Control Defined for X-Direction:

$$X = X_\Delta - \frac{X_{Vat(Max)}}{2}$$

where:

X=Center distance in EBM control in X $X_{vat(Max)}$=Maximum size of the vat in X Parameters Defined by Camera for Y-Direction (Assuming Camera Captures Bottom Left Area of Vat):

$$Y_{66} = Y_{Edges} - P_{Center(Y)}$$

where:

$Y_{Edges}$=Distance between edge of vat camera image and edge of part detected in image in Y $P_{Center(Y)}$=Center distance of part detected in camera image in Y Center in EBM Control Defined for Y-Direction:

$$Y = Y_\Delta - \frac{Y_{Vat(Max)}}{2}$$

where:

Y=Center distance in EBM control in Y $Y_{Vat(Max)}$=Maximum size of the vat in Y Based on the foregoing, it can be appreciated that a number of embodiments, preferred and alternative, are disclosed herein. For example, in one embodiment, a method of manufacturing a three-dimensional product can be implemented, which includes steps or operations such as, for example: initiating a fabrication of a three-dimensional part from powder spread over a work table as a powder bed; pausing the fabrication and cooling the work table to room temperature to obtain access to the three-dimensional part; and continuing fabrication by preheating the powder rather than the work table until fabrication of the three-dimensional part is complete.

In an example embodiment, the aforementioned access to the three-dimensional part allows for embedding of a foreign object in the three-dimensional part within the powder bed while the three-dimensional part remains in a non-finished state. In still another example embodiment, access to the three-dimensional part allows for repair of the three-dimensional part during a post-processing operation. In still another example embodiment, a step or operation can be implemented or processed involving utilizing varying material options including materials matching a composition of a foreign object or a material of a different composition to assist in rendering a damaged component better than new.

In another example embodiment, steps or operations can be implemented or processed, for example, for varying of an intensity of an energy beam from a low intensity; and applying the energy beam with the varying of the intensity to the powder bed to avoid smoking of the powder. In another example embodiment, a step or operation can be implemented or processed to gradually increasing the intensity of the energy beam to avoid powder repelling of the powder during the preheating. In another example embodiment, a step or operation can be implemented for automatically recording with a controlling computer, a last registration of a position of the energy beam during an initial portion of the fabrication of the three-dimensional part.

In another example embodiment, a visual feedback system can be implemented for use in case the three-dimensional part is removed from the powder bed to resolve any registration issues thereof. In yet another example embodiment, a step or operation can be provided for storing a prior build position using the visual feedback system and determining a following build position utilizing a reference recorded by the controlling computing during a prior processing step of the fabrication.

In another example embodiment, a system for manufacturing a three-dimensional product can be implemented. Such a system can include, for example, a work table, wherein a fabrication of a three-dimensional part from powder spread over the work table as a powder bed is initiated; wherein the fabrication is paused and the work table is cooled to room temperature to obtain access to the three-dimensional part; and wherein the fabrication is continued by preheating the powder rather than the work table until fabrication of the three-dimensional part is complete.

In another example system embodiment, access to the three-dimensional part allows embedding of a foreign object in the three-dimensional part within the powder bed while the three-dimensional part remains in a non-finished state. In still another example system embodiment, access to the three-dimensional part allows for repair of the three-dimensional part during a post-processing operation. In another example system embodiment, an energy beam source can provide an energy beam, wherein an intensity of the energy beam is varied from a low intensity, and wherein the energy beam is applied with variable intensity to the powder bed to avoid smoking of the powder.

In some example embodiments, the intensity of the aforementioned energy beam can be gradually increased to avoid powder repelling of the powder during the preheating. In yet another example system embodiment, a controlling computer can be utilized, wherein the last registration of the position of the energy beam can be automatically recorded by the controlling computer during an initial portion of the fabrication of the three-dimensional part. In some example system embodiments, a visual feedback system can be utilized, which resolves any registration issues in case the three-dimensional part is removed from the powder bed. In some example embodiments, a prior build position can be storable via the aforementioned visual feedback system; and a following build position is determinable utilizing a reference recorded by the controlling computing during a prior processing operation of the fabrication.

In another example embodiment, a three-dimensional apparatus can be configured, wherein such an apparatus includes a three-dimensional part configured via a fabrication from powder spread over a work table as a powder bed; wherein the fabrication is paused and the work table is cooled to room temperature to obtain access to the three-dimensional part; and wherein the fabrication is continued by preheating the powder rather than the work table until fabrication of the three-dimensional part is complete.

It will be appreciated that variations of the above-disclosed and other features and functions, or alternatives thereof, may be desirably combined into many other different systems or applications. It will also be appreciated various presently unforeseen or unanticipated alternatives, modifications, variations or improvements therein may be subsequently made by those skilled in the art, which are also intended to be encompassed by the following claims.

What is claimed is:

1. A method of manufacturing a three-dimensional product, comprising:
   initiating a fabrication of a three-dimensional part from powder spread over a work table as a powder bed;
   pausing said fabrication and cooling said work table to room temperature to obtain access to said three-dimensional part; and
   continuing fabrication by preheating said powder rather than said work table until fabrication of said three-dimensional part is complete.

2. The method of claim 1 wherein said access to said three-dimensional part allows embedding of a foreign object in said three-dimensional part within said powder bed while said three-dimensional part remains in a non-finished state.

3. The method of claim 1 wherein said access to said three-dimensional part allows for repair of said three-dimensional part.

4. The method of claim 3, wherein repair of said three-dimensional part comprises pre-processing procedures.

5. The method of claim 4, wherein the pre-processing procedures comprise at least one of CNC machining or polishing.

6. The method of claim 1 further comprising utilizing varying material options including materials matching a composition of a foreign object or a material of a different composition to assist in rendering a damaged component better than new.

7. The method of claim 1 further comprising:
varying of an intensity of an energy beam from a low intensity; and
applying said energy beam with said varying of said intensity to said powder bed to avoid smoking of said powder.

8. The method of claim 7 further comprising gradually increasing said intensity of said energy beam to avoid powder repelling of said powder during said preheating.

9. The method of claim 7 automatically recording with a controlling computer, a last registration of a position of said energy beam during an initial portion of said fabrication of said three-dimensional part.

10. The method of claim 9 further comprising utilizing a visual feedback system in case said three-dimensional part is removed from said powder bed to resolve any registration issues thereof.

11. The method of claim 10 further comprising storing a prior build position using said visual feedback system and determining a following build position utilizing a reference recorded by said controlling computing during a prior processing step of said fabrication.

12. A system for manufacturing a three-dimensional part, comprising:
a work table, wherein the work table is configured to be preheated prior to a fabrication of a three-dimensional part, and the work table is further configured to be cooled to room temperature while the fabrication is paused to obtain access to the three dimensional part;
an energy beam source that provides an energy beam;
a controlling computer, wherein the controlling computer is configured to automatically record a last registration of a position of the energy beam during an initial portion of the fabrication of the three-dimensional part; and
a visual feedback system, wherein the visual feedback system is configured to resolve any registration issues in case the three-dimensional part is removed from a powder bed.

13. The system of claim 12 wherein the access to the three-dimensional part allows embedding a foreign object in the three-dimensional part within the powder bed while the three-dimensional part remains in a non-finished state.

14. The system of claim 12 wherein the access to the three-dimensional part allows for repair of the three-dimensional part during a post-processing operation.

15. The system of claim 12 wherein an intensity of the energy beam is configured to be varied from a low intensity, and wherein the energy beam is applied with variable intensity to the powder bed to avoid smoking of the powder.

16. The system of claim 15 wherein the intensity of the energy beam is configured to be gradually increased to avoid powder repelling of the powder during the preheating.

17. The system of claim 12 wherein:
a prior build position is storable via the visual feedback system; and
a following build position is determinable utilizing a reference recorded by the controlling computing during a prior processing operation of the fabrication.

* * * * *